(No Model.)

H. M. HERRING.
WATCH CHAIN HOOK.

No. 372,675. Patented Nov. 8, 1887.

Witnesses
Thos Houghton.
E. W. B. Phillips

Inventor
Henry M. Herring.
By his Attorneys
Singleton and Piper.

United States Patent Office.

HENRY MORTIMER HERRING, OF NORTH ATTLEBOROUGH, MASSACHUSETTS, ASSIGNOR TO OSCAR M. DRAPER, OF SAME PLACE.

WATCH-CHAIN HOOK.

SPECIFICATION forming part of Letters Patent No. 372,675, dated November 8, 1887.

Application filed August 23, 1887. Serial No. 247,651. (No model.)

*To all whom it may concern:*

Be it known that I, HENRY MORTIMER HERRING, of North Attleborough, in the county of Bristol, of the Commonwealth of Massachusetts, have invented a new and useful Improvement in Vest and Watch Chain Hooks or Attachments; and I do hereby declare the same to be described in the following specification, and represented in the accompanying drawings, of which—

Figure 1:
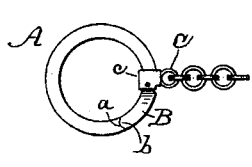
Figure 2:
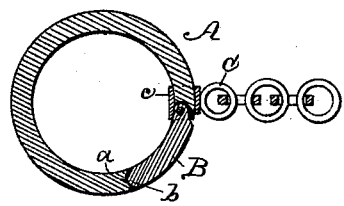
Figure 3:
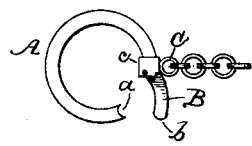
Figure 4:
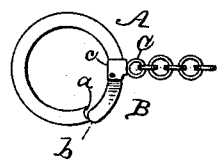

Figure 1 is a side view, and Fig. 2 a longitudinal section, on an enlarged scale, of one of my improved attachments, its gate in such figures being shown as closed. Fig. 3 is a side view as its appears with the gate open. Fig. 4 is a side view showing the gate as in contact with the recessed end of the hook, but not in engagement therewith.

The nature of my invention is defined in the claims, hereinafter presented.

This attachment, though analogous in some respects to that shown and described in the United States Patent No. 297,498, differs materially therefrom in others, for there is in its gate no spring latch or bolt; nor is such gate socketed, or tubular and slotted, to receive such a latch or bolt and its actuating-spring; nor is the suspension swivel or ring fastened to the gate, but it extends directly from the arcal hook, which is recessed in its free end to receive the round end of the gate, and when the gate is closed holds itself in engagement therewith by the inherent elasticity of it (the said hook.) By having the suspension-ring fixed to the hook rather than to the gate, any downward pull or strain on the hook has no tendency to pull open the gate when the hook is in the button-hole of a vest.

In the drawings, A denotes an arcal portion of a ring, such portion being about two hundred and ninety degrees of a circle, on its measure or length, and may be termed "the hook." The gate, or arcal part B, is a portion of a ring, and is about seventy degrees of a circle thereof, in measure or length, such gate at one end being hinged directly or indirectly to the hook at one end thereof. The other end of the hook has in it a notch, $a$, semicircular, or thereabout, in form, and the next adjacent end of the gate is semicircular or rounded, as shown at $b$, to enter and fit the said notch.

The suspension-ring C is fastened to the part A, or to a tube, $c$, fixed on the end of the part A, in which case the gate B enters at one end and is pivoted to the tube. The gate, on being pressed down against the notched end of the hook, will force such end away from it (the said gate) until the crown of the convexity of the end of the gate may have passed the upper tenons of the notch, which, taking place, the inherent elasticity of the hook will cause such hook to close upon the gate, or the latter to shut and with force to be held closed. Thus in closing the gate half-way the ring will be expanded, the elastic force of expansion serving to effect the further closing of the gate and to retain it in a closed state under ordinary circumstances.

I do not claim a watch chain hook constructed as represented in the said patent No. 297,498.

I claim—

1. The above-specified improved vest and watch chain attachment, composed of the elastic arcal hook A, notched in one end, as represented, and the arcal gate B, rounded at one end to fit the notch in the hook and at the other hinged to the hook, all being so that the spring or elasticity of the hook shall operate, as explained, to retain the gate in its closed state.

2. The vest or chain attachment, consisting of the expansive arcal hook, notched in its end, as described, the suspension-ring secured to such hook near its other end, and the arcal gate hinged to the hook at such end and rounded to enter and engage with the notched end of the hook, all being so that the spring or elasticity of the hook shall operate, as explained, to retain the gate in its closed state.

3. The vest and chain attachment, consisting of the suspension-ring C, the tube $c$, the elastic arcal hook A, notched, as represented, at its free end, and the gate B, hinged to the tube $c$ and rounded at its outer end to fit and snap into the notch of the hook, all being arranged substantially as set forth.

HENRY MORTIMER HERRING.

Witnesses:
J. E. POND, Jr.,
E. E. BARROWS.